G. W. STEDMAN.
Sewing Machine.
No. 706. Reissued April 26, 1859.
Fig. 4,
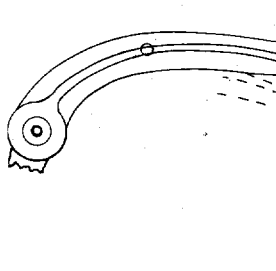
Fig. 1,
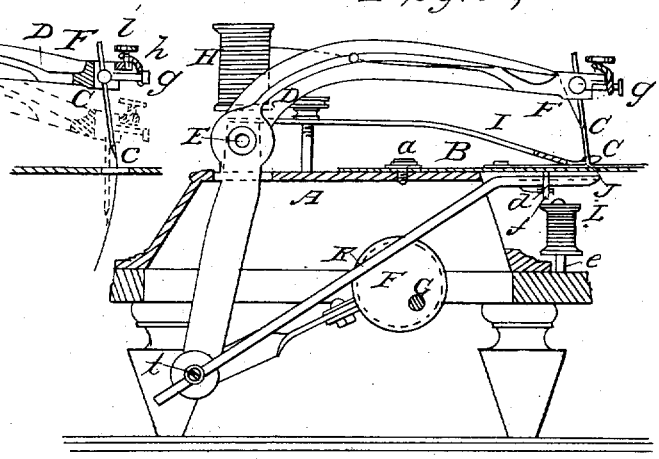
Fig. 5
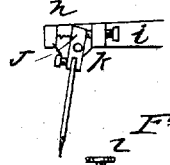
Fig. 3
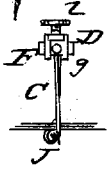
Fig. 2,
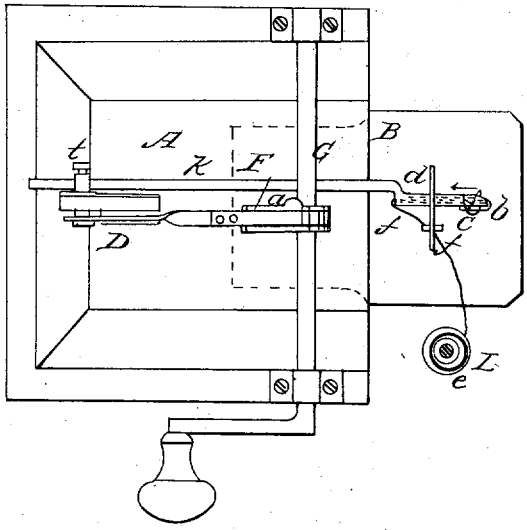
N. PETERS, Photo-Lithographer, Washington, D. C.

UNITED STATES PATENT OFFICE.

GEORGE W. STEDMAN, OF VIENNA, NEW JERSEY; EMELINE M. STEDMAN, EXECUTRIX OF GEORGE W. STEDMAN, DECEASED.

IMPROVEMENT IN SEWING-MACHINES.

Specification forming part of Letters Patent No. 12,074, dated December 12, 1854; Reissue No. 706, dated April 26, 1859.

*To all whom it may concern:*

Be it known that GEO. W. STEDMAN, of Vienna, in the county of Warren and State of New Jersey, deceased, did invent certain new and useful Improvements in the Sewing-Machine; and the following is hereby declared to be a full, clear, and exact description thereof, reference being had to the annexed drawings, making part of this specification.

Figure 1 is a longitudinal vertical section. Fig. 2 is an inverted plan. Fig. 3 is a front view of the needle and tube which carries the locking-thread. Fig. 4 is a side view of the needle-arm, showing the method in which the needle operates for the purpose of feeding the cloth. Fig. 5 is a side view of a modified arrangement of the needle.

In these improvements in the sewing-machine all the usual cumbrous and noisy machinery is dispensed with, and certain combinations of parts are used, by which, with a comparatively few pieces, a series of important results are produced, which had before been obtained only by the combined action of a much greater number of parts.

This invention improves the sewing-machine in the manner in which a great number of parts are dispensed with by making a single vibrating lever operate direct the needle, the concatenating-instrument, and the feeding device; also in the particular manner of arrangement and combination of the mechanical details.

The first part of this invention consists in a certain new and useful device employed, in combination with a needle, to effect the interlacing of two threads, one of which is protruded through the cloth by a needle, forming a loop in the same manner as in most of the sewing-machines now in use, and the other of which passes through the said loop and forms another loop through which the needle and first thread pass, thus forming a double series of interlacing loops on one side of the cloth.

The second part of this invention relates to the arrangement of the looping-tube with respect to a guide fixed on a plate auxiliary to the bed-plate, and adjustable thereon, to bring the tube into the proper relation to the needle.

The third part of this invention consists in the employment of a two-armed vibrating lever to actuate both the needle and the looping-tube or its equivalent, as hereinafter described, when such lever is arranged and operates with respect to the bed or table of the machine in substantially the manner described, by which it becomes practicable to fix the needle in the extremity of one arm, while the other extends below the platform and communicates a reciprocating motion to the looper.

The fourth part of this invention relates to feeding the cloth by means of a needle which is made to pass through the same in a position, with respect to its length, diagonal to its line of movement, combined with a spring to throw the needle in position to feed the cloth the next stitch, and a screw to regulate at will the length of the stitch.

To enable others to make and use these improvements, the invention will now be more fully described.

A is the bed plate or frame, to which all the parts of the machine are attached.

B is an auxiliary plate, secured to the table or frame A by a screw, *a*, on which it is movable when desired. This plate serves as a support in part for the cloth or material to be sewed. It has a slot, *b*, through which the needle works, and has attached to it the gage C, which guides the cloth.

D is the needle-arm, reaching out over the cloth or material being sewed, from the rock-shaft E, and carries the needle *c;* and it also extends down beyond the rock-shaft below the cloth or material to be sewed, and is there connected with the eccentric F on the main shaft G. This eccentric performs no other function, especially, than to impart a regulated extent of motion to the parts which perform the sewing, and may therefore be displaced for any other equivalent rotating prime mover which will act in substantially the same manner.

H is the spool which supplies the needle with thread.

I is the spring-presser which holds the cloth to the surface of the plate B during the sewing.

K is a rod, which is connected to the lower part of the needle-carrier, and is for the purpose of producing on the looping-tube J, hereinafter described, a movement imparted from or by the needle-carrier in such a manner as to cross contiguous to the path of the needle, in order that the two as hereinafter set forth, may co-operate with each other's threads and perform sewing. The distance of the point of connection of the rod K with the needle-carrier from the rock-shaft E determines the extent of motion of the looping-tube, and the adjustment of the rod K by the screw *t* disposes the position of the end of the looping-tube to cause the tube to take correctly the loop of needle-thread. As the looping device is arranged to cross contiguous to the needle-path, and is directly connected with the needle, motion may be imparted to either, and they will always sustain those relations to each other which are necessary to their co-operation to perform sewing.

J is the looping-tube. It is open from end to end, and is arranged to work under the plate B, (in a guide, *d*, attached to the plate) close to the needle and opposite to one side thereof, in a similar manner to the shuttle commonly employed. This tube is connected by the rod K, before referred to, with that part of the needle-carrier which is below the rock-shaft, so that it will work back and forth as the needle works up and down, always retreating from the needle during the descent of the latter, and advancing toward it when it is being retracted from the cloth. The tube is so formed at the front end (see Fig. 2) as to throw its point toward the needle, so that it may not fail to pass through the loop of the needle-thread (which thread is shown in blue lines) left by the needle on the under side of the cloth. This tube has a thread, which, for the sake of distinction, I will call the "tube-thread," (shown in red lines,) passing through it from a spool, L, placed on an upright pivot, *e*, and entering it at the back end of the tube and leaving it at the front end. The thread, before it enters the tube, passes through a hole in the guide-piece *d*, where friction is produced upon it by a plug, *f*, of leather or other material. The tube is arranged and moved in such a manner as to cross contiguous to the needle-path, so that every time the needle passes through the cloth and leaves a loop the tube enters it during the retraction of the needle, and the thread emerging from the point of the tube lies along that side of the tube which is next to the needle. By the time the tube has advanced as far as it is allowed, the needle (having been retracted to its greatest distance from the cloth) has drawn its loop tight around the tube and that part of the tube-thread lying by the side of the tube, and as the tube recedes that portion of its thread which has been protruded through the loop on the needle-thread is caused to form a loop, into which the needle enters as it makes its next descent through the cloth simultaneously with the retraction of the tube. As the tube is retracted it leaves its own loop in the loop of the needle-thread and draws its own thread tight around the needle, so that when the needle is withdrawn from the cloth the new loop in the needle-thread is left protruding through and tightly grasped by the above-described loop of the tube-thread. In Figs. 1, 2, and 3 of the drawings the tube is supposed to be just withdrawing from the loop of the needle-thread and the needle to be just entering the loop in the tube-thread. It will be understood from the foregoing description that the tube-thread is left in the form of a loop through a loop in the needle-thread, and then receives a loop of needle-thread, and therefore the action of the needle and tube in forming the stitch differs entirely from that of the needle and shuttle, which shuttle the tube appears to resemble. Yet the substitution for the looping-tube of any other device capable of co-operating with the needle to concatenate or form the stitch and perform sewing will not alter nor affect that part of this invention which relates to the combination of the tube or its equivalent with the vibrating lever, which carries the needle, as herein set forth.

The above operation of sewing can be effected with a needle attached to the arm in the usual manner, and is entirely independent of the feeding device which I am about to describe. This device is entirely dependent for its motion in feeding the cloth upon the reciprocations of the needle-carrier, which take place in carrying the needle in and out of the cloth in performing the sewing. It is particularly illustrated in Fig. 4, though also shown in Figs. 2, 3. F in those figures represents a roller or short rock-shaft provided with journals fitted to transverse bearings in the end of the needle-arm D. This roller carries the needle *c*, which is inserted through it and secured transversely to its axis; and it carries also a stud or screw, *g*, which is to be connected by a spring, *h*, of india-rubber or other elastic substance, with a screw, *i*, screwed into the arm, or with some part of the arm, in such a way as to throw the stud *g* against the front of the screw *i*, or some fixed part of the arm, to hold the needle in a position tangential or otherwise oblique to an arc described from the pivot E. The force applied to the needle to drive it through the cloth tends to push the stud *g* hard up against the screw *i*, or other stop provided for the purpose, and thus make a rigid connection with the arm. The point or any part of the length of the needle, while fixed relatively to the arm, describes an arc from the center E, as indicated by the dotted arc in Fig. 4; but the point describes a larger arc than any other part. Consequently as the needle descends through the cloth the cloth is drawn toward the center E to the extent indicated by the change of position of the parts in contact with the cloth in black and red outline. The strength of the spring *h* must be insufficient to overcome the friction of the presser I, or its equivalent, upon the cloth, and consequently as the needle is withdrawn from the cloth the roller F will move in its bearings and allow the needle to draw up freely without moving the cloth; but as soon as the needle leaves the cloth the spring *h* will throw it to the tangential or oblique position first described, when, on the next descent of the needle, it will pierce the cloth in a new position.

The length of vibratory movement of the needle's point may be varied to alter the length of stitch by means of the screw *i*, by which the point is brought nearer to or farther from the arc described by the base of the needle. The feed may be given in any direction by placing the needle obliquely in that direction to the path in which it moves, whether it be attached to an arm or to a straight bar moving in a right line. The latter modification of this arrangement of the needle (seen in Fig. 5) consists in securing it in a small stock, *j*, which is pivoted by a screw or pin, *k*, to the arm D, and has a spring, *h*, applied above the pivot to drive it back against the screw *i*.

The proper lateral adjustment of the tube J and the slot *b* of the table is effected by simply unscrewing the bolt *a* and moving the plate B to the right or left, as necessary. The distance between the guide *d* and the rear end of the rod K is so great, compared to the distance between the guide and the point of the tube, that the relation between the tube and slot in the plate is not perceptibly influenced.

Having thus described these improvements in the sewing-machine, what I claim as the invention of GEO. W. STEDMAN, deceased, and desire to secure by Letters Patent, is—

1. The tube herein described, receiving thread in the manner specified, and acting in combination with the needle, so that each forms a series of loops, each of which loops receives one and is received by the next one of the other series, as set forth.

2. The auxiliary plate carrying the guide for the looping-tube, and secured to the bed-plate, substantially in the manner specified, so as to be adjustable to any desired position relatively with the needle, for the purposes set forth.

3. A reciprocating tube or equivalent device co-operating with an eye-pointed needle to concatenate or form the stitch and produce sewing, essentially as specified, combined with and receiving its motion from one end of a lever the fulcrum of which is at or near the bed or table of the machine, while the other end carries the said needle, substantially as described.

4. Feeding the cloth by means of a needle, which is made to pass through the same in a position with respect to its length diagonal to its line of movement, as specified, in combination with a spring to throw the needle into position to feed the cloth the next stitch, and the screw or its equivalent to determine and regulate the length of the stitch, substantially as specified.

EMELINE M. STEDMAN,
*Executrix of Geo. W. Stedman, deceased.*

Witnesses:
W. H. HOWELL,
DANIEL HULL.